INVENTOR.
PAUL FESSEL

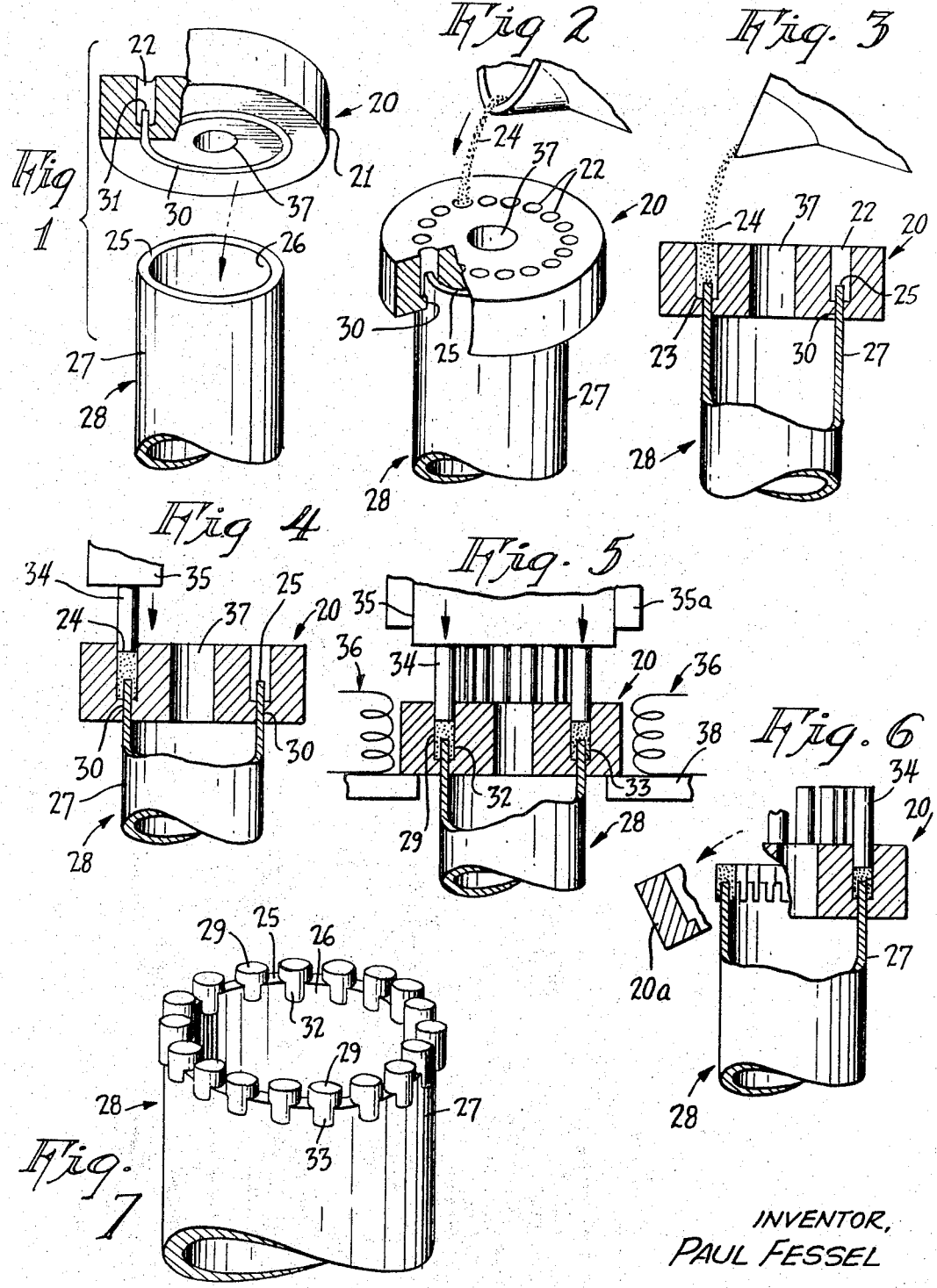

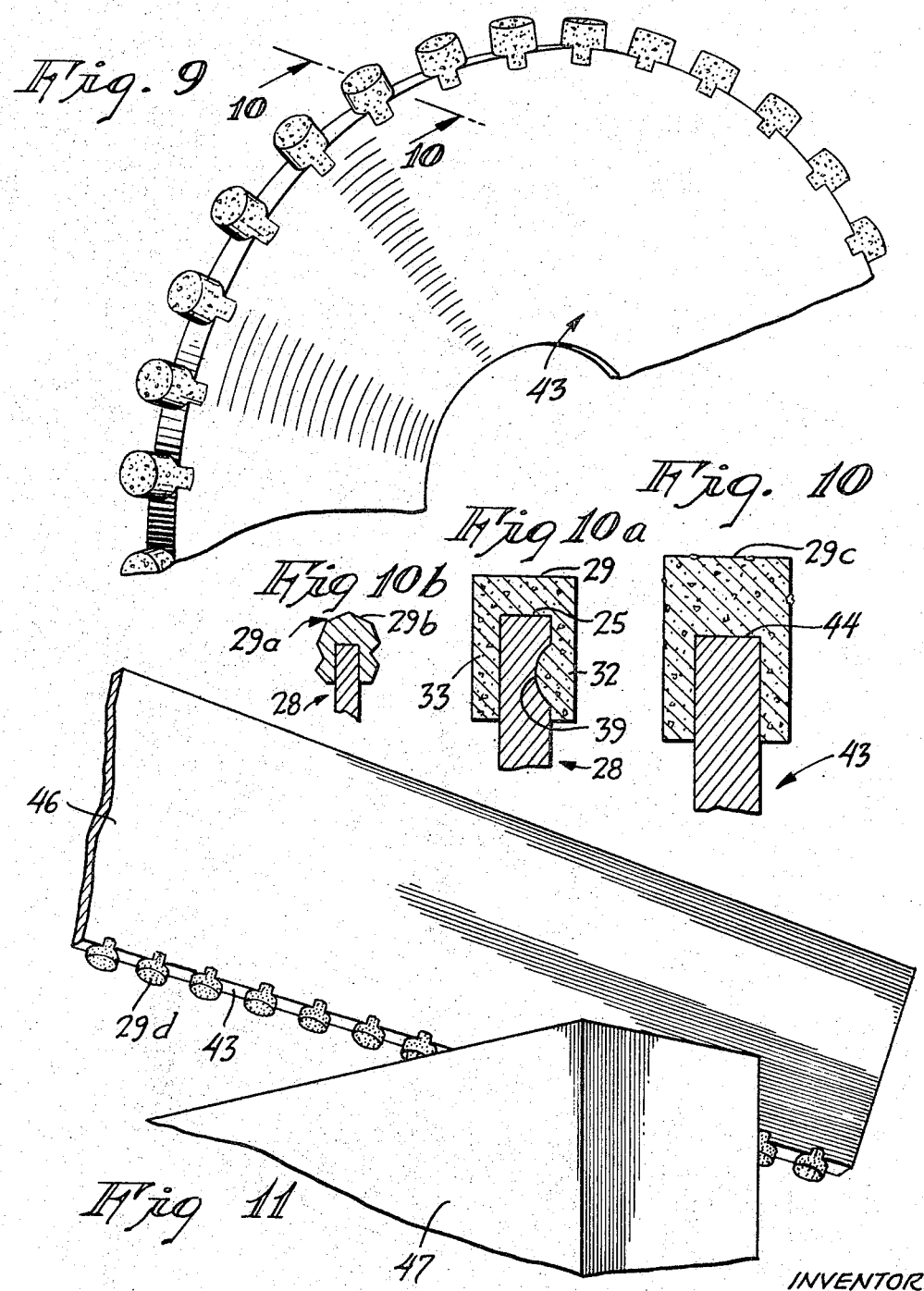

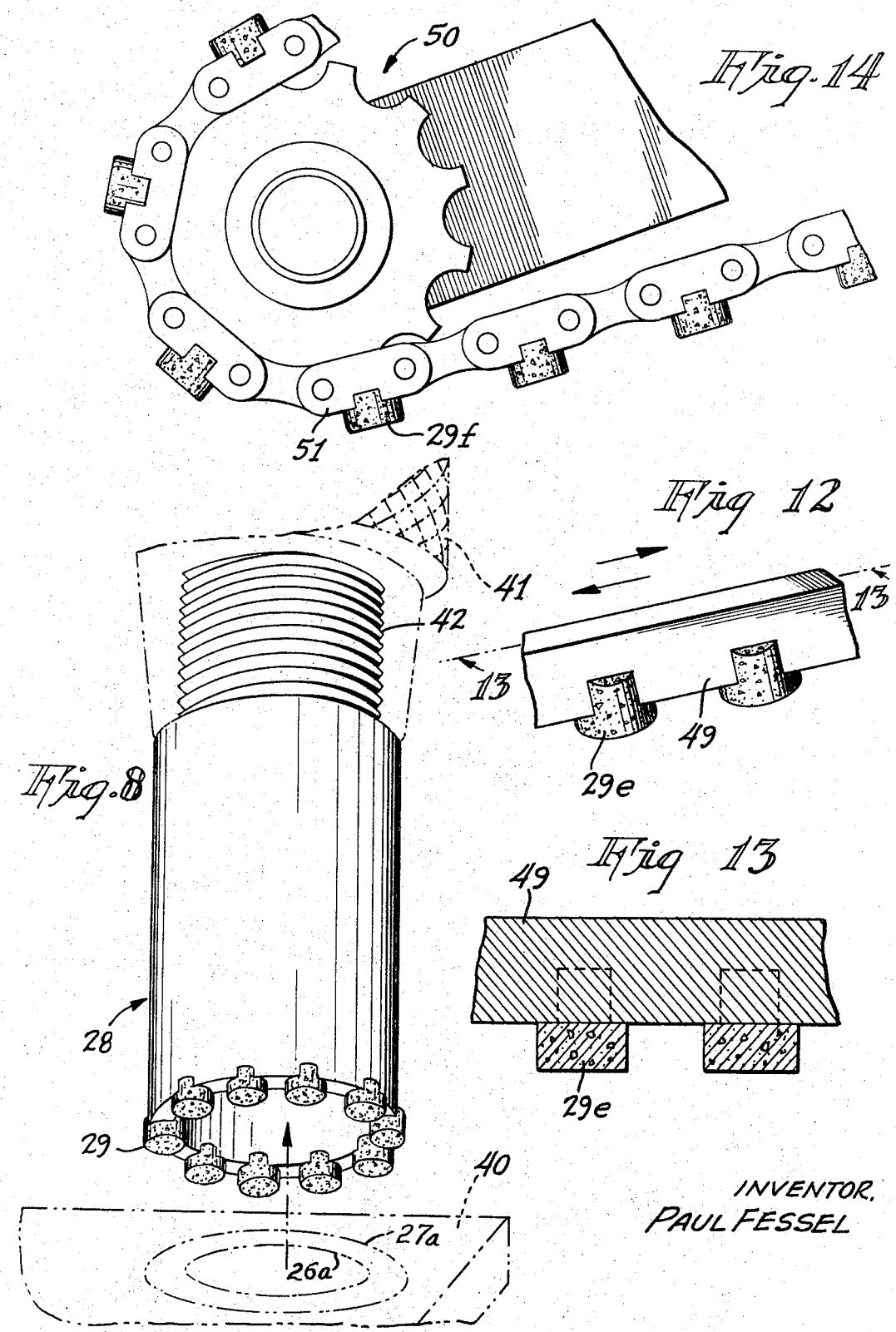

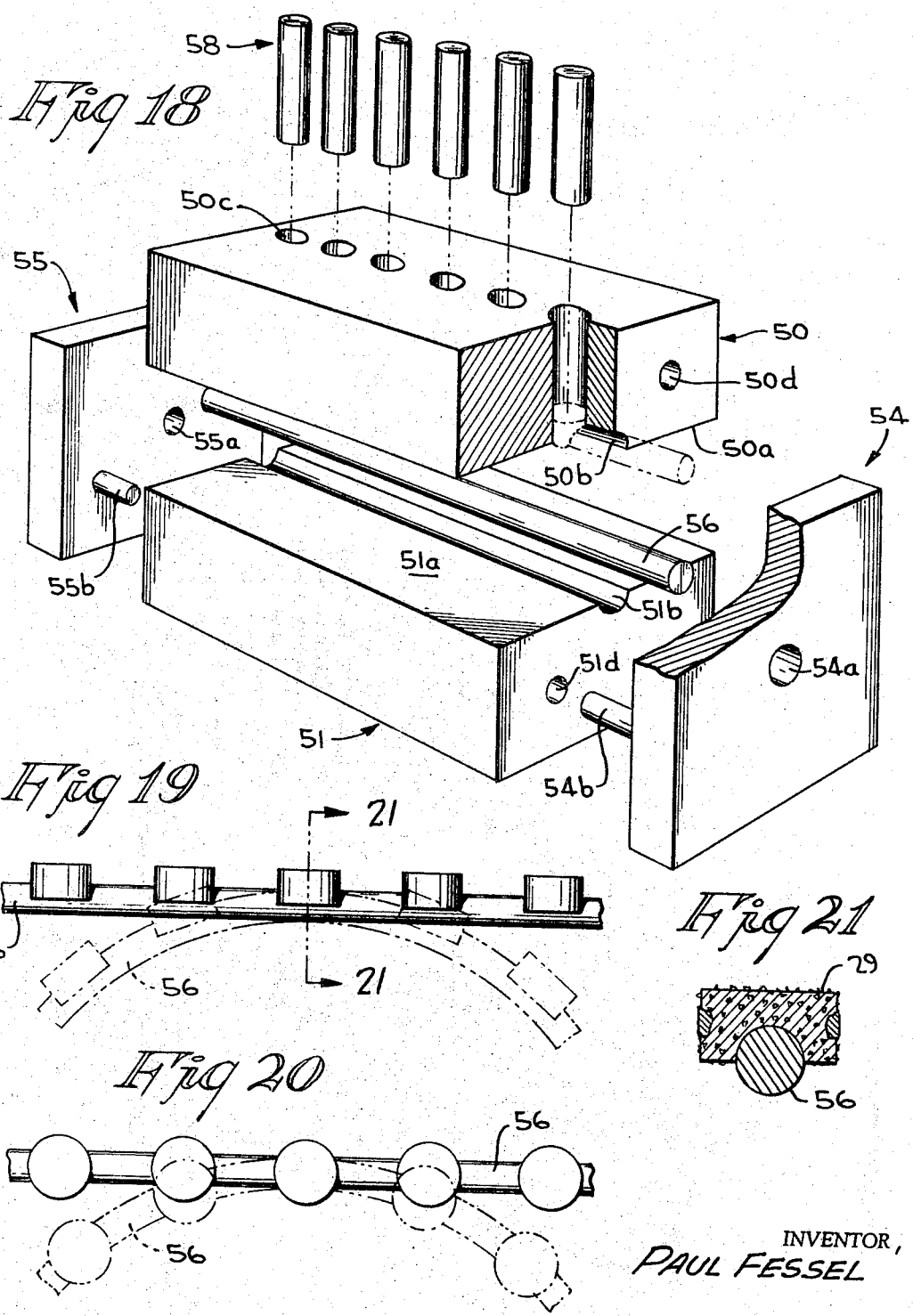

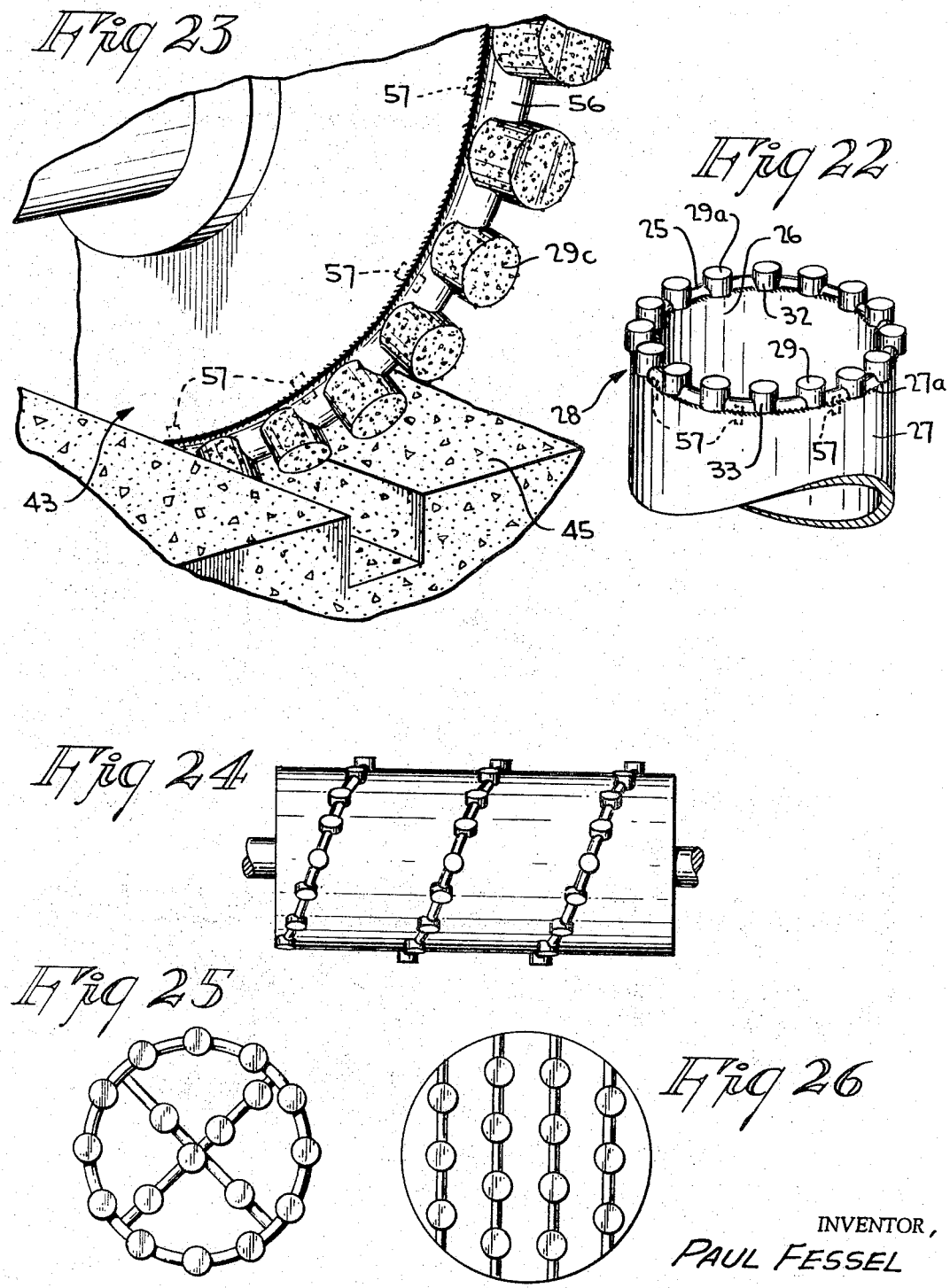

United States Patent Office 3,343,308
Patented Sept. 26, 1967

3,343,308
CUTTING AND GRINDING DEVICES
Paul Fessel, 1111 Ocean Ave., Brooklyn, N.Y. 11230
Filed Dec. 30, 1965, Ser. No. 517,751
12 Claims. (Cl. 51—395)

ABSTRACT OF THE DISCLOSURE

A prefabricated cutting device adapted to be rigidly affixed to a cutting tool comprising a plurality of abrading elements spaced apart on and fixedly attached to a wire is described. The prefabricated cutting device can be mass produced or stocked in a relatively few standard sizes and shapes and utilized to construct or repair a variety of kinds and sizes of cutting or grinding tools.

---

The present invention relates to cutting and grinding devices. An important aspect of the present invention relates to the manufacture of diamond abrasive cutting devices of the metallic bonded variety, to novel processes for the simultaneous formation of an abrasive cutting body and the bonding of same to a suitable tool substrate to form a unitary cutting tool to novel molds employed in effectuating these processes and to the products obtained thereby. The present application is a continuation-in-part of U.S. application Ser. No. 260,912, filed Feb. 25, 1963, now U.S. Patent No. 3,277,416, which application in turn was a divisional application of then co-pending U.S. application Ser. No. 5,675, filed Feb. 1, 1960, the latter now abandoned.

One object of the present invention is to provide improved tools for the construction industry.

Drilling or cutting problems encountered in the construction industry are magnified in view of the power and speed limitations of the conventional driving tools and the non-conformity of the substrates such as green concrete and the like upon which diamond tools must operate. In general contact of the side portions of the tool with the bounding walls of the groove formed in the abraded substrate during the cutting or abrading operation provides frictional resistance proportional to the contacting areas. Such frictional resistance tends to noticeably reduce the speed of the tool or require more power for operation at any given speed. To provide an efficient tool as possible for the minimum power available in the conventional driving tools, the industry has attempted to use core bits having as thin a tool substrate as possible permitting use of a leading cutting edge with similarly thin cross sectional area to provide the limited or narrow kerf minimizing the amount of power required. Methods heretofore available for providing retention of the matrix or abrading surface to the leading edge of such thin walled tools have proved limited; and it is one purpose of the present invention to improve prior practices in this respect.

It is also an object of the present invention to provide a new and improved abrasive cutting device which avoids the disadvantages in manufacture and use associated with the prior types. It is another object of the present invention to provide a new and improved discontinuous abrading or cutting device in which the cutting bodies are bonded directly to a compatible tool substrate with a greater bond strength and which attachment of the abrading bodies is designed to obviate the problems associated with a molten phase between the abrading body and the tool substrate. It is yet a further object of the present invention to provide a cutting device of simple construction wherein the cutting elements are protected from shock since there are no angular protruding edges to catch debris and become dislocated. It is still another object of the present invention to provide a cutting device construction wherein the abrading body is of such design as to provide minimum contact with the work surface to minimize the frictional engagement and unnecessary concomitant wear. A further object of the invention resides in the provision of a cutting tool having a plurality of spaced cutting bodies moldably mounted on the tool edge of minimum dimension for positive retention and wherein the cutting bodies extend along and superpose the adjacent and opposite side walls of the tool to provide concavo-concave channels between opposing cutting bodies for cooling, to permit the sludge or pulverized material to escape freely without adding to the frictional resistance offered the cutter, and to permit coolant to circulate for cooling purposes if desired.

A further important object of the present invention is to provide a prefabricated cutting device of novel design prepared in accordance with the foregoing objects which is free of a molten state between the abrading body and the tool substrate and which is adaptable to a broad spectrum of tool substrates to provide, by application of the prefabricated cutting edge, many different kinds of tools such as, for example, circular or linear blades, tubular grinders and drills, and drum grinders as well. The prefabricated device provided by the invention furnishes to the trade for the first time means which can be mass-produced or stocked in a few standard sizes and shapes and employed to fabricate or repair an unlimited variety of kinds and sizes of cutting or grinding devices.

FIGURE 1 is an exploded view in perspective showing a destructible die in registering position with a tube for application to the edge thereof of a plurality of spaced cutting heads;

FIGURE 2 is another view in perspective partly in section showing the die applied to the tube edge in a concentric groove and showing spaced cylindrical die openings in process of being loaded with impregnating material;

FIGURE 3 is a diametric sectional view of FIGURE 2 showing the die openings and the die groove in engagement with the tube edge and walls thereof;

FIGURE 4 is a diametric sectional view similar to FIGURE 3 showing one of several plungers for each of the die openings after die opening loading;

FIGURE 5 is a diametric sectional view partly in elevation showing a pressure plate applied to the tops of the plungers for molding, sintering and fusing of the loading matrix material within the die under controlled elevated temperature to the edge and adjacent side walls of the tube;

FIGURE 6 is a diametric sectional view partly in elevation showing breaking away and destruction of the die after the cutting heads are formed;

FIGURE 7 is a view in perspective of the resultant tool having a plurality of spaced cutting heads impregnated on a tube edge and on opposite adjacent side walls in saddle formation;

FIGURE 8 is a view in perspective showing the tool of FIGURE 7 mounted for drilling operation;

FIGURE 9 is a view in perspective showing the cutting heads of FIGURES 1–7 applied to a disc type of cutting tool;

FIGURE 10 is a sectional view of FIGURE 9 across the plane 10—10 thereof;

FIGURE 10a is a sectional view of a form of cutting head applied to a tool edge having a retention indentation on the side wall thereof;

FIGURE 10b is a sectional view of a form of cutting head applied to a tool edge having a cutting matrix ground for facet formation;

FIGURE 11 is a view in perspective showing cutting heads as applied to form a band saw type of tool;

FIGURE 12 is a view in perspective showing cutting heads applied to form a reciprocating type of tool;

FIGURE 13 is a sectional view across plane 13—13 of FIGURE 12;

FIGURE 14 is a view in perspective showing cutting heads applied to form a chain saw type of tool;

FIGURE 18 is an exploded view in perspective showing a multiple-membered die in registering position with a wire for application to the small dimension thereof of a plurality of spaced cutting heads to form the prefabricated cutting device of FIGURES 19–21.

FIGURE 19 is a side view of a length of prefabricated device according to the present invention in which there is illustrated in broken lines the manner in which the prefabricated device can be bent in arcuate form in connection with applying it, for example, to the edge of a sawblade body;

FIGURE 20 is a plan view of the same prefabricated device, illustrating in dotted lines the manner in which the prefabricated device can be bent in preparation for applying it to the edge of a tube;

FIGURE 21 is a cross sectional view of the prefabricated device shown in FIGURE 19 showing in dotted lines the manner in which gauge stones may be set in the innermost and outermost portions of the abrading elements;

FIGURE 22 is a perspective view showing a tool of the kind shown in FIGURE 8 which has been made by application of a prefabricated cutting device to the periphery of a cylindrical shank;

FIGURE 23 is a fragmentary perspective view showing a prefabricated device on the periphery of a rotatable disc, and illustrating in dotted lines the manner in which the prefabricated device may be attached to the disc body at points intermediate the abrading elements;

FIGURE 24 is a diagram showing the manner in which the prefabricated cutting device may be applied to the surface of a drum to form a grinding drum;

FIGURE 25 is a diagrammatic view of the upper end of a tubular drill as shown in FIGURE 22 illustrating the manner in which lengths of prefabricated cutting device may be arranged across the mouth of the drill to provide a non-coring type drill; and FIGURE 26 is a diagram showing one manner in which the prefabricated edge may be applied to the face of a disc to provide a disc grinder.

Figure 15:
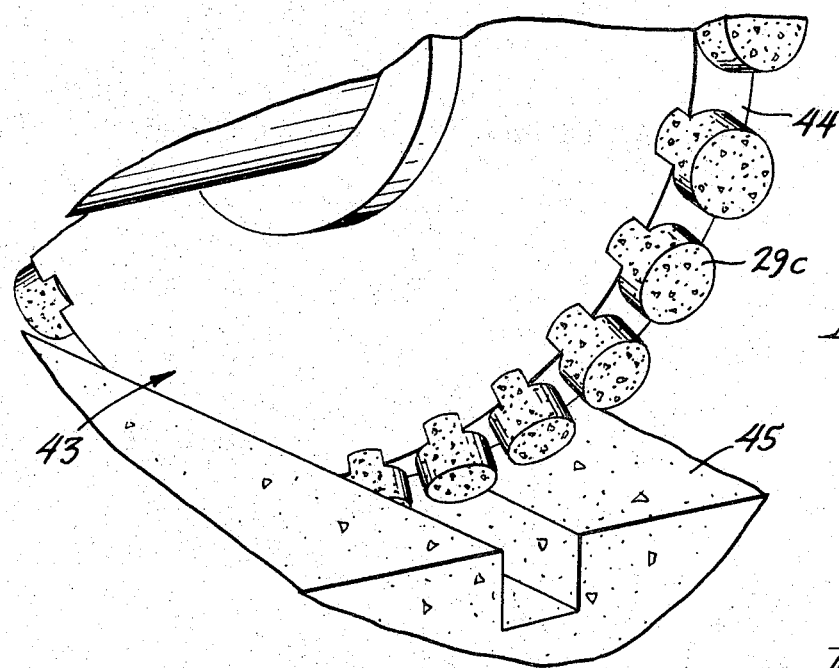
FIGURE 15 is a fragmentary view in perspective showing the cutting heads impregnated on the periphery of a rotating disc, the device being in process of effecting a cut groove in stone material.
Figure 16:
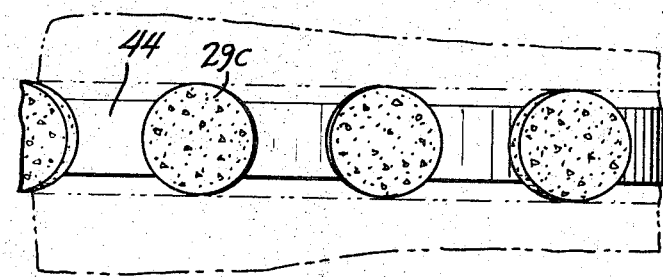
FIGURE 16 is a top plan view of the cutting surface of the cutting heads shown on the periphery of the disc in FIGURE 15.
Figure 17:
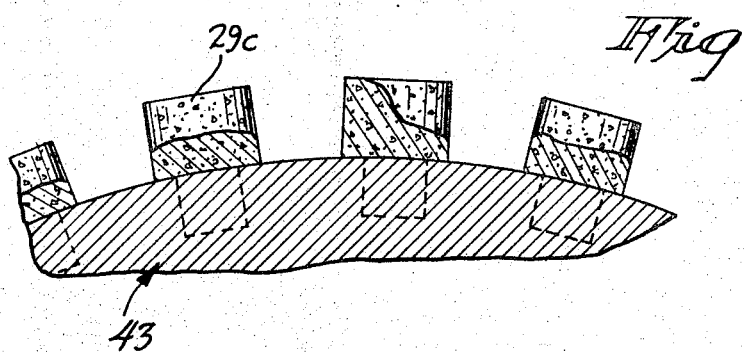
FIGURE 17 is a view in elevation of the structure shown in FIGURE 16.

Referring to the drawing and particularly to FIGURES 1–7, showing one embodiment of the present invention, numeral 20 indicates generally a main die formed of graphite or ceramic material and as shown consists of a disc or solid block 21 shown in the form of a cylindrical section and includes a plurality of individual, spaced and vertical bores each indicated by numeral 22 and all drilled preferably to a common selective depth from the upper face of the block, the bottom of each of the bores being indicated by numeral 23. As shown, bores 22 are concentrically arranged and each is adapted to receive a load of impregnating material 24 for molding, sintering, fusion and integration with the edge 25 and adjacent wall portions of side walls 26 and 27 of a cutting tool shank such as tubing 28.

For in situ molding, sintering, fusion and saddlelike connection of the impregnating material 24 toward the formation of cutting heads or slugs 29 on shank 28, die 20 on the underside has a concentric slot or groove 30 to serve as a mortise for the end portion of tubing 28 and being of a predetermined depth, the circular axis formed of the centers of bores 22 as is obvious from FIGURES 2–6.

Important considerations of the invention reside in the integral relationship of bores 22 and slot 30 formed in a one piece or unitary die 20; in the respective dimensioning of said bores and slot; and in the single use of the die for each cycle or use of operation, the die requiring shattering and destruction for removal.

Thus, the diameter of each of the bores 22 is predeterminable in excess of the width of slot or reentrant recess 30 for kerf control by the formed slug 29; and each of the bores is predeterminably dimensioned in length and in extension below the ceiling or top wall 31 (see FIGS. 1 and 2) of the slot for control of slug height above shank edge 25 and for control of depth of the slug saddlelike arcuate sides 32 and 33 below the shank edge.

It is to be noted that die 20 as shown is provided with a central opening 37. Its function is to expedite registering formations of slot 30 and bores 22 from the original graphite or ceramic block. Thus, the die block may be mounted on an arbor through opening 37 for first drilling bores 22 on one side, and then reversing the block on the arbor for milling slot 30.

It is to be observed that alignment between die 20 and shank 28 is effected by the abutment between shank edge 25 and slot ceiling 31 as best seen in FIGURES 1 and 2; said abutment obtains in die 20 intermediate each adjacent bore pairs; that tool shank edge 25 and adjacent side wall portions serve as a connected, complementary and contacting die with matrix 20 to form molding areas therewith as with each of the bores 22 which the shank edge and adjacent side wall portions penetrate to the aforesaid limited extent.

It is understood that the edge 25 of shank 28 may have a rounded, beveled or other geometric shape and as stated that the shapes and dimensions of the molding areas afforded by shank 28 and die 20 may vary to suit requirements.

It is to be observed that following connection or fitting of shank 28 with die slot 30 and after loading the bores 22 with a predetermined quantity of impregnating powder 24, a die apparatus for a molding procedure is set up whereby application of controlled pressure under controlled temperature to the fittted die 20 and shank 28 effectuates a simultaneous molding, sintering and fusing of abrasive-containing matrix powder or tungsten carbide or other powder of cutting potential. For such purpose a removable or shatterable graphite or ceramic plunger 34 having a projecting upper end 35 is used as a compression element fitted for reciprocation in each of the bores 22; a controlled pressure platen 35 to simultaneously engage each of the upper plunger ends is utilized and a conventional heating apparatus generally indicated by numeral 36 surrounds the die 20. Depending upon known requirements, pressure applied to the impregnating powder in each of the molds formed between each bore 22 and shank edge and side wall parts by plungers 34 vary depending upon nature, amount and disposition of the impregnating powder, while temperatures may also vary including a range of 1800–2400 degrees F.

As to problems of support, registration of parts and distribution of pressure loads for the aforementioned single cycle compression operation, the invention comprehends the use of a fixed support such as diagrammatically illustrated at 38 for die 20 to receive the impact of compression pressure imposed by a descending platen 35 engaging the tops of plungers 34 which below are in bores 22, the platen being suitably mounted in a frame such as is diagrammatically illustrated at 35a. Thus no pressure is transferred to shank 28 during the molding, sintering and fusion operation.

Following such molding, sintering and fusion, the graphite or ceramic die with the plungers 34 is broken away or shattered as at 20a. The cost of die 20 and of plungers 34 are sufficiently low to justify shattering for removal after each molding, sintering and fusion operation is completed. The graphite or ceramic used and the processing of same involves a negligible cost compared to the cost of production of the cutting tool.

One specific embodiment in accordance with the present invention is illustrated by FIGURES 7 and 8. As shown in FIGURE 8 a core bit constructed in accordance with the present invention includes a substantially cylindrical body or shank 28 that is formed of material capable of withstanding drilling strains and shaped to provide an axial bore to pass a core when the bit is in operation. The upper end of the body is of reduced diameter and provided with a threaded portion 42 to connect the bit with a conventional core barrel indicated generally as 41. At the end of the drill bit opposite from the reduced threaded portion 42, the cutting edge portion of the bit is formed by a plurality of cylindrical abrading bodies 29 superposed on the leading edge 25 and depending wall portions 26 and 27 to provide a discontinuous leading cutting edge formed by a plurality of circular abrading faces 29a, a discontinuous inner reaming face defined by a plurality of arcuate surfaces 32 all of which are abrading or cutting surfaces by reasons of having diamonds dispersed throughout the impregnating matrix from which the abrading bodies are prepared. The matrix is formed of suitable metal alloy or plastic capable of bedding the abrading elements therein as described above and providing a degree of hardness sufficient to prevent undue cutting or washing out of the imbedded diamonds but sufficiently soft to permit predetermined controlled erosion of the metal to continually expose the abrading particles so that the cutting edge is "self-sharpening" yet incapable of becoming matrix metal bound. The matrix body extends outwardly from depending major faces 26, 27 of tool shank 28 a suitable distance to provide a depth of material necessary to provide the predeterminable kerf and to define inner and outer vertical courses 26a and 27a. The courses 26a and 27a are inter-connected across the drilling face to form a plurality of concavo-concave passages arranged in radially selectively spaced apart relationship about the periphery of the bit with circular cutting faces 29a therebetween. Accordingly, the surfaces defining the concavo-concave passages between segments are not geometrically radial but are arcuate surfaces substantially equidistant from the true radii. When the bit rotates, that portion of leading edge which is superposed over the small dimension 25 of the tool shank is forward and the outer 33 and inner 32 portions of the leading edge is rearward, so that the cuttings impinge upon the leading surface of each cutting body at a suitable angle to be deflected outwardly and away from the surface being abraded. The concavo-concave courses increase capacity from their junctures overlying the small dimension or leading edge 25 to the outer limits to facilitate movement of drilling fluid therethrough and accommodate freely the cuttings discharged there into from abrading circular surfaces 29g. While the drill bit illustrated by FIGURES 7 and 8 is of cylindrical construction and configuration, with the cutting faces 29a lying in a substantially flat planar configuration, in a further modification of this embodiment, the cutting faces 29a may be machined to provide a generally toroidal-shaped surface so that the annular bit has a discontinuous outer peripheral reaming surface 33, a discontinuous inner peripheral reaming surface 32, which inner surface abrades and defines the core, and a leading cutting face 29 which can be smoothly arcuate on each segment providing a thinner initial cutting surface with concomitant fast penetration and control of kerf width. Although spaced slugs 29 on shank 28 are shown in specific number, the number thereof may be varied by variation in the number of bores 22, it being feasible to have slugs at 90 degree intervals. Moreover, the diameter of bores 22 may also be varied as well as their dispositions to give slugs of different diameters and disposition depending on requirements.

FIGURES 1 through 6 illustrate the method according to the present invention for simultaneously forming and bonding a plurality of spaced cutting bodies of unique design to the small dimension of a tool substrate of fixed parameters, circumference etc.

In accordance with another embodiment of the invention there is provided a prefabricated cutting device, employing the aforedescribed principles, which is capable of attachment to a wide variety of tool substrates of varying parameters by conventional methods as welding, brazing, soldering and the like.

Referring at this juncture to FIGURE 18 there is shown a die employable in the process of the invention to prepare a prefabricated cutting device of the kind shown in FIGURES 19, 19a and 19b. The die consists of elongated platens 50, 51. Each of platens 50, 51 has one major flat planar face 50b, 51b. Each major face has a reentrant recess, 50b, 51b corresponding to approximately one-half the cross section of an elongated tool substrate of substantially uniform geometric shape. When platens 50, 51 are placed with faces 50a, 51a in face-to-face engagement with reentrant recesses 50b, 51b in substantial registry, reentrant recesses 50b, 51b form a bore through the assembled mold corresponding to the size and shape of the elongated tool substrate insertable therein. Platen 50 is provided with a plurality of through bores 50c disposed in pre-selective spaced apart relationship. The longitudinal axis of each of through bores 50c lies in the median plane of reentrant recess 50a. Companion blocks 50, 51 are held in face to face engagement by means of side platens 54, 55. Platens 54, 55 are provided with through bores 54a, 55a defined therethrough in substantial registry with the through bore defined by reentrant recess 50b, 51b. Side platen 54, 55 are provided with guide pins 54b, 55b in one face thereof in substantial registry with openings 50d, 51d in each of cavity blocks 50 and 51. To assemble the mold, blocks 50 and 51 are brought in face to face engagement with reentrant recess 50a and 51a in substantial registry. Side platens 54, 55 are then fitted to the combination of blocks 50, 51 with registering pins 54b, 55b fitted into openings 50d, 51d.

The tool substrate 56, e.g., a rod or wire is inserted through opening 54a in side platen 54 through the cavity defined between blocks 50, 51 and extended through port 55a in side platen 55, or may be placed in position before the platens 50, 51 are assembled. The surface of the wire exposed to the cavities of through bores 50c thus cooperates with the walls of through bore 50c and the planer surface of block 51 immediately adjacent the reentrant recess, wherein the tool substrate lies, to form a plurality of substantial symmetrical unitary cavities which are disposed about the surface of the wire in such manner that the cavity extends to the point of greatest width with respect to the extension of the longitudinal axis of the through bores 50c. A suitable impregnating matrix forming composition is charged into each of the cavities in substantially equivalent mounts and a plunger 58 is inserted in the cavity of each through bore 50c and the combination of die, tool substrate and impregnating composition subjected to heat and pressure as previously described in reference to FIGURES 1 through 6 of the drawing. When the fuse-bonding process has been completed, the combination of die and completed unitary prefabricated cutting device is allowed to cool and the die is readily removed by prying end plates 54, 55 from bodies 50, 51 by suitable means exposing the completed prefabricated tool device having the plurality of abrading body fusibly bonded thereto in the preselected spaced apart relationship corresponding to the mold.

As the prefabricated tool device is linear in construction and formed upon a readily deformable, malleable or ductible tool substrate, any length of proper dimension corresponding to the length of the cutting device of the tool shank to which the prefabricated cutting edge is to be attached to form the completed tool can then be severed from the arbitrary length of cutting edge and shaped by suitable means to conform to the edge of the tool shank, e.g., cylinder, disc, drum, etc., to which it is to be attached by suitable means such as welding and like suitable bonding means. The cutting device can be manufactured in a large number of designs or parameter including, e.g., the diameter of the cylinder abrading body per se, the distance between abrading bodies, the nature of the impregnating composition, nature of abrading stones, and the like. Thus, the prefabricated device can be manufactured in a wide variety of combinations in a central manufacturing plant and easily fastened to a disc, drum or sleeve to make or repair a completed tool at the site of use. Accordingly, should accident or injury to the tool occur, replacement thereof or manufacture of a new tool can be effected utilising a prefabricated cutting device as described and materials and tools readily available without recourse to costly or complicated molds or the like.

A prefabricated cutting device of the kind which can be formed, for example, as described with reference to 18, is shown in FIGURES 19, 20 and 21.

In the form shown the diameter of the cylindrical abrading bodies 29 are twice that of the wire 56 on which they are formed and the distance between the abrading bodies 29 is about equal to their diameter. These relationships are of value when making a prefabricated edge which is to be shaped by bending it in a vertical plane as illustrated in dotted lines in FIGURE 19 preparatory to assembling it on a disc as shown in FIGURE 23, or in horizontal plane preparator to fixing it on a sleeve as shown in FIGURE 20. The fact that the abrading bodies are circular, or at least curvelinear in cross section, enables them to present to the work substantially a surface of the same form even when the wire or substrate on which they have been formed is bent in order to make it conform in shape to the edge of the tool body to which it has been attached. Consequently, these cylindrical abrading bodies 29 can be replaced advantageously with abrading bodies having a hemi-spherical form. Similarly the above-mentioned relative dimensions of the wire and abrading bodies in the illustrated form of prefabricated edge results in the abrading bodies extending radially (or simply outwardly in the case of a liner tool) a sufficient distance from the substrate 56 and the tool body edge to which it is attached so as to prevent the latter elements from contacting the work. This is the basic consideration in selecting the relative diameters of the cylindrical abrading bodies and the wire, and the distance between the abrading bodies themselves, and applies irrespective of the plane or planes (FIGURE 22 or FIGURE 23) in which the prefabricated edge is bent. A further advantage provided by the prefabricated device is that it may be attached to a tool body by welding, silver soldering and the like at points between the abrading bodies 29, so that the application of heat involved in attaching the prefabricated device to the tool body will not deleteriously affect the properties of the abrading body or its attachment to the wire substrate. This type of spot attachment to a tool body between abrading elements 29 is illustrated in dotted lines at 57 in FIGURES 22 and 23. This eliminates or reduces the need for copper jigs or water immersion to draw heat away from the abrading bodies when joining the prefabricated edge to a tool body. The versatility of the prefabricated device is further illustrated by the diagrams of FIGURES 24, 25 and 26.

FIGURE 24 illustrates how a prefabricated device may be helically formed on a drum to provide a grinder or polishing device for use for example on concrete and the like.

FIGURE 25 shows how a core drill of the kind illustrated in FIGURE 22 may be modified to a grinding drill or non-coring drill simply by arranging one or more pieces of prefabricated device across the open end of the drill.

FIGURE 26 illustrates how a grinding plate may be formed simply by attaching to the face of a disc straight (as shown) or curved prefabricated device.

In applications where it is desirable, and there are many of these, to provide gauge stones, it will be apparent that well known techniques can be used to surface set gauge stones in one or more of the abrading bodies 29 of the prefabricated edge. It is apparent that the gauge stones may be placed on the outer or inner side, or on both sides of the abrading body 29.

The versatility of the prefabricated cutting device of the kind described above extends, if desired, to forming the body entirely of matrix material and surface setting in the matrix diamonds or other abrasive particles in the customary manner. The prefabricated device is also adaptable to forming a series of sawteeth on a bendable wire which may then be attached to the periphery of a disc to provide a circular saw. To accomplish this, a prefabricated device is formed in the same manner as described earlier with reference in FIGURE 18, for example, except that the abrading elements 29 are formed entirely of tungsten carbide which is similarly sintered or fused onto a wire 56. Thereafter, the abrading elements 29 may be ground into the form of saw blade teeth, and this assembly of teeth on the wire may thereafter be attached to the periphery of a disc to provide a saw blade. It will often be preferable, however, to first attach the prefabricated device to the tool body and thereafter grind the abrading elements 29 into the desired form of teeth. These same procedures may be used in forming a drilling bit in which case the prefabricated device is fixed to the peripheral edge of a tubular tool body instead of a disc. As explained earlier, the prefabricated device thus formed and prepared may be attached to the periphery of the tool body by welding, brazing or silver soldering at points intermediate the teeth.

The wire 56 on which the abrading elements have been formed has been referred to above as being ductile and this term as used herein is meant to include any wire which is deflectable to conform to the shape of the edge to which it is to be applied and which when so deflected can be attached to a tool body by welding, brazing, silver soldering and the like. As indicated above, one example of a satisfactory wire is commercial stainless steel wire and wire generally identified as high nickel alloy wire.

The circular cutting faces of the prefabricated device are also separated by a plurality of concavo-concave voids or grooves having the narrowest distance of separation between juxtaposed cutting bodies disposed substantially within the area of the small dimension of the tool substrate and widening toward the peripheries on both sides of the tool substrate. Each of the cutting faces has a leading arcuate cutting edge forming one side of the concavo-concave void and an arcuate trailing edge defining a concavo-concave void with the next adjacent cutting body so as to provide sufficient relief to keep the cutting faces clear of cuttings which are swept into the concavo-concave voids between the cutting faces and upwardly through the vertical courses between the cutting bodies. Because of the cooperable relationship between the arcuate leading edge of one cutting body and the arcuate trailing edge of the adjacent or juxtaposed cutting body, outer portions of the concavo-concave cavities or voids between the adjacent bodies diverge from the median plane of the void so that a portion of the matrix forming the cutting edge will be leading the remainder of the same face as the tool moves in either direction.

It is of course self-evident that the substantially symmetric configuration and placement of the cutting or abrading bodies upon the elongated tool substrate enables the cutting body to function with similar efficiency and co-action of surfaces and parts regardless of the direction of rotation or movement of the cutting edge with regard to the work surface of the substrate being abraded. Accordingly, the prefabricated cutting edge can be employed in tools intended for rotational, unidirectional and reciprocal movement. Moreover, the nature of the simultaneously fused bond or weld between the cutting bodies and the elongated tool substrate avoids the presence of a molten state arising between the abrading bodies and the tool substrate from generation of heat resulting from the frictional engagement of the cutting body with the work surface of the substrate being abraded. Coupled with the aforementioned characteristics of the design and relationship of the cutting bodies to each other and to the tool substrate, the prefabricated cutting device of the present invention is one in which the undesirable or deleterious stresses upon the cutting bodies are minimized with concomitant diminution in probability of loss of segments, increased efficiency and lessening in costs connected with repairs.

The tool embodying slugs 29 is capable of cutting not only vitreous, concrete and other materials but penetrates reinforced concrete including steel or other hard metallic material. Moreover, the tool with slugs 29 may have a longer life than the depth of projecting slugs 29 above shank edge 25; for when edge 25 is circumferentially exposed, slug portions 32 and 33 may still do the cutting all the way down to the depth thereof, the circumferential metallic surface 25 wearing down and cutting being done by the top exposed portions of the wing elements 32 and 33. Additionally, the slugs 29 may have the diameter or overall cutting dimension varied by the stated method of production, so that the bigger the kerf the less chance of eroding the shank 28 of the tool when the latter is off center during drilling operations.

In FIGURE 10a, shaft 28 is modified to have spaced indentations 39 on the outer or inner sides adjacent edge 25 for increasing the retention between slugs 29 and end portion of the shaft 28. However, such indentations are not necessary for retention during tool operation because of the saddle connections to resist shear and other stresses.

In FIGURE 10b, a slug 29a is shown formed from a cutting type of uniform matrix without containing an abrasive such as tungsten carbide. However, such a slug has its faces ground for conventional cutting facets such as 29b.

FIGURE 8 shows the operation of the cylindrical tool with its slugs 29 operative on a slab of stone or concrete 40 shown in phantom. The shank 28 at its end is conventionally coupled (as by threading 42 if desired) to a rotary power tool diagrammatically indicated by numeral 41.

FIGURES 9, 10 and 15 show slugs 29c similar to slugs 29 applied to a type of cutting tool having a disc body 43 with a circular edge 44 to which the saddle-formed slugs are applied in selectively spaced relationship. Of course, in the method of molding, sintering and fusing the slugs 29c on the disc edge 44, the die 20 is suitably modified (not shown) as by the use of a plurality of ring segments having a groove along the center of the bottom to engage a segment of the disc 43, there also being corresponding spaced bores in the same relationship with the groove as applies to the die 20. Procedures similar to that obtaining for die 20 are used in production.

FIGURE 11 shows slugs such as 29d similar to slugs 29 applied to a band saw type of tool having a shank 46, the tool being applied to a slab 47. Here again, in the method of molding, sintering and fusing the slugs 29d on the edge 48 and side wall portions of shank 46, die 20 is suitably modified (not shown) as by use of a plurality of longitudinal rods having a groove along the center of the bottom wall to engage segments of the shank edge 48 and adjacent side walls, there also being corresponding spaced bores in the same relationship with the groove as applies to the die 20. Procedures similar to that obtaining for die 20 are used in production.

In FIGURES 12 and 13 is shown a reciprocating type of tool having a shank 49 and slugs 29e of similar nature, formation and process of application as applies to band saw type of tool shown in FIGURE 11.

In FIGURE 14 is shown a chain-saw type of tool generally indicated by numeral 50 wherein each link 51 is provided with one or more slugs 29f of similar nature, formation and process of application as applies to the type of tools shown in FIGURES 11 and 12–13.

FIGURE 22 shows the prefabricated cutting device applied to a tool shank 28 by means of a weld joint 27a to form a tool similar to the core bit of FIGURES 7 and 8. The attachment between the cutting device and shank can be accomplished by any conventional welding technique using a compatible filler metal. The cutting device and tool so joined can be employed for drilling purposes. If desired, the resulting tool can be turned or trimmed on a lathe or similar means to adjust the kerf and true the radius. As the abrading bodies are directly fuse-bonded to the wire or other suitable substrate, the resulting tool is free from a molten state or third component at the essential points which are subject to frictional heat, stress and the like. The hemi-cylindrical extensions of the abrading bodies fuse-bonded to the arcuate depending surfaces of the wire oppose shear stress and breakage.

FIGURE 21 shows a fragmentary section of the prefabricated cutting device of the present invention applied to the peripheral edge of a disc or wheel to form a cutting tool similar to the cutting tool of FIGURE 15. As shown prefabricated cutting device is bonded to the periphery of the wheel by weld joints. The tool so prepared can be utilized as such or the side portions of the cutting bodies reduced to adjust the kerf on a lathe or like device. Similarly, the radius of the discontinuous cutting face may be trued in similar manner.

The prefabricated device finds particular utility in manufacturing segmental saw blades of large diameter which cannot otherwise be made without great stresses created in the disc resulting from heating only its periphery. By preparation of a disc blank as in FIGURE 21, through a groove circumferentially about the periphery adapted to receive the reverse surface of the prefabricated cutting device, the cutting device can be spot brazed, soldered or attached by like suitable means which avoids the presence of a third fluid component, e.g., solder or brazing at the interface between the abrading bodies per se and the tool shank. The resulting tool has the peripheral cutting elements bonded to the elongated tool substrate with greater bond strength than tools heretofore available and the attachment of the cutting elements in the aforesaid manner reduce under cutting of the tool shank. Where the prefabricated cutting device erodes to a point of no utility and the tool shank is otherwise suitable for continued use, the consumed prefabricated device may be removed and replaced with a new device with comparative ease, utilizing conventional tools and affording concomitant reducing in costs.

The prefabricated cutting device is designed to provide sufficient relief between each circular segment for receipt of the dust or sludge formed by each cutting face, and for circulation of the coolant essential for dissipating the heat generated by the frictional abrading process and for complete flushing away of the dust or sludge collected therein. The diverging regions defined by the arcuate surfaces of each pair of associated trailing and leading edges defining the outer periphery cause loose, abrasive particles to be radially and tangently displaced from the juncture between the tool shank and the cutting or abrading bodies minimizing erosion or "wash" thereof and concomitant weakening of the juncture. The working end of the resultant tool has a configuration and construction whereby frictional contact of the tool shank and the side walls of the cut is prevented with the result that the power required to actuate the tool is substantially diminished and abrasion of the depending side faces of the tool shank is minimized. The circular abrading bodies sinter-bonded to the elongated substrate in the manner described provide a minimum of bending stress upon each circular segment and a maximum of bendability or deformability to the elongated substrate enabling the prefabricated cutting device to be attached to a broad spectrum of tool substrates to provide a wide variety of cutting and abrading edges with a minimum of stress concentration at the juncture of the abrading segments and the tool substrate.

The cutting action of the abrasive cutting device prepared in accordance with the present invention is superior to that of other types in that the abrasive bodies cut smoothly and are free of tendency to grab. The arcuate leading and trailing edges and concavo-concave voids therebetween are capable of being selectively arranged so that the cutting edge is completely uniform as the forming and fuse bonding of the bodies about the small dimension of the tool substrate is accomplished simultaneously by a mold which is easy and economical to prepare yet can be precision machined to extremely accurate limits. Moreover, the nature and strength of the bond between the abrading bodies and the tool substrate eliminates the presence of a third component and is accordingly superior to the cutting edges encountered in the prior art. The cutting bodies are by design protected from shock as there are no sharp or angular protrusions to catch and wedge debris inbetween. Additionally, undue "wash" or undercutting of the tool shank or tool substrate is minimized due to the nature of the expanding divergent vertical courses formed between cutting bodies.

In one embodiment of the invention the abrading bodies are composed of diamond grit embedded and dispersed in a hard matrix metal such as is well known in the art. It is understood that any suitable hard abrasive grit dispersed in any suitable hard mixture metal falls within the scope of the invention. Advantageously, the abrasive bearing metal matrix powder is pre-sintered in a suitable graphite mold to create a pellet of the desired mixture sufficiently threaded together to be easily inserted in the plurality of bores. The pellets can be desirably formed in an atmosphere controlled furnace at appropriate temperatures determinable for the metal powder or combinations of powders being utilized. It may be mentioned that the cutting device herein described as a preferred embodiment is particularly useful in cutting relatively hard substrates as well as substrates of non-conformity encountered in the construction industry such as green concrete, bottom brick, sand stone, and the like. In cutting devices of the segmental type, difficulties have been encountered in such cutting operations from the tool shank being worn out at the region of the junction edge between the abrading bodies and the tool shank. This abrasive action is due in large measure to the abrasive action of the loose abrading particles at the aforesaid junction which thins the tool shank at the region where the abrading bodies are bonded to the tool shank. This abrasive action tends to weaken the junction leading to premature accidents or loss of cutting elements. Because of the hemi-cylindrical side extensions of the cutting bodies forming the saddle-like bond junction the tendency to undercutting is substantially eliminated becuse of the arcuate leading edge. The overlapping of the hemi-cylindrical side extensions forming the saddle-like bonding also permits the circular cutting bodies to be disposed along the cutting device in selective spaced apart relationship permitting a greater proportion of "relief" without concomitant deleterious breakage of the cutting bodies. Moreover, since the saddle-like attachment is formed about the planer surface and depending sides the problems associated with the land and grooved designs of cutting edges heretofore known are not encountered.

The prefabricated cutting edge can be prepared from an elongated wire, rod and the like of substantially uniform geometric cross section. By the term of "substantially uniform geometric cross section" I include a circle, square, rectangle, polygon, oval, triangle, and the like.

What I claim is:

1. A prefabricated cutting device comprising a series of spaced apart abrading elements sintered to a ductile wire, the said elements being circular in cross-section, and of greater width than the wire.

2. A prefabricated cutting device as claimed in claim 1 in which the abrading elements consist of a diamond containing matrix and one or more of said elements has a diamond gauge stone mounted on its periphery.

3. A prefabricated cutting device as claimed in claim 1 in which the abrading elements consist of diamonds surface set in sintered metal matrix.

4. A prefabricated cutting device as claimed in claim 1 in which the abrading elements consist of tungsten carbide.

5. A prefabricated cutting device as claimed in claim 4 in which the abrading elements are in the form of saw teeth.

6. A prefabricated cutting device comprising a series of spaced apart abrading elements of the same size and shape sintered to a wire, said elements being centered on and of greater width than the wire, and the wire being bent in an arc, the said elements being spaced apart along the wire so that the outermost surface portions of adjacent elements on the convex side of the arced wire define a plane which lies outwardly of any point on the wire.

7. A prefabricated abrading cutting device adapted for attachment to a tool body, said prefabricated cutting device comprising an elongated substrate of substantially uniform geometric cross section of small dimension, and a plurality of cylindrical abrading bodies comprised of a uniform matrix and abrasive particles dispersed throughout, said matrix sinter-bonded to said substrate about said small dimension, said abrading bodies disposed in selectively spaced apart relationship with the longitudinal axis of each body lying along the median plane of said substrate, each of said abrading bodies having a substantially uniform cross section and a diameter greater than said cross section of small dimension, said bodies intersecting said elongated substrate for a substantial distance to form a discontinuous, segmental cutting edge having (a) an end operative grinding face lying in a plane above the surface of said substrate comprised of a plurality of (1) cutting faces and (2) concavo-concave voids extending across said end operative grinding face, in alternating arrangement, said concavo-concave voids providing increased capacity for flow from said substrate in the direction of the peripheries of said end operative cutting face and (b) arcuate abrading surfaces extending perpendicularly of said cutting faces providing discontinuous reaming surfaces of minimum contact and forming a plurality of passages defined by arcuate surfaces diverging from said substrate providing a greater capacity for flow in the proximity of the periphery of the reaming surfaces than in the proximity of the substrate.

8. The prefabricated cutting device according to claim 7 wherein said elongated tool substrate is a ductile metal, whereby the cutting device can be bent to conform to the shape of a tool surface for attachment thereto.

9. The prefabricated cutting device according to claim 7 wherein said metal is a weldable stainless steel alloy.

10. The prefabricated cutting device according to claim 7 wherein the uniform geometric cross section is a circle and the abrading bodies intersect the elongated substrate to the widest dimension of said cross section.

11. A prefabricated tool edge comprising a series of spaced apart abrading elements sintered to a ductile wire.

12. A prefabricated cutting device comprising a series of spaced apart abrading elements sintered to a wire, said elements being circular in cross section and of greater width than the wire.

References Cited

UNITED STATES PATENTS

| | | | |
|---|---|---|---|
| 1,950,356 | 3/1934 | DeBats | 29—95 X |
| 2,339,270 | 1/1944 | Kelleher | 51—309 |
| 2,679,839 | 6/1954 | Metzger | 125—21 |
| 2,811,960 | 11/1957 | Fessel | 125—15 |
| 3,110,579 | 11/1963 | Benson | 51—209 X |

ROBERT C. RIORDON, *Primary Examiner.*

D. G. KELLY, *Assistant Examiner.*